(12) United States Patent
Lin et al.

(10) Patent No.: US 8,406,512 B2
(45) Date of Patent: Mar. 26, 2013

(54) STEREO MATCHING METHOD BASED ON IMAGE INTENSITY QUANTIZATION

(75) Inventors: Huei-Yung Lin, Minxiong Township, Chiayi County (TW); Pin-Zhih Lin, Taipei (TW)

(73) Assignee: National Chung Cheng University, Chiayi County (TW)

(*) Notice: Subject to any disclaimer, the term of this patent is extended or adjusted under 35 U.S.C. 154(b) by 152 days.

(21) Appl. No.: 13/100,749

(22) Filed: May 4, 2011

(65) Prior Publication Data

US 2012/0195493 A1 Aug. 2, 2012

(30) Foreign Application Priority Data

Jan. 28, 2011 (TW) .............................. 00103297 A (51) Int. Cl.
 *G06K 9/00* (2006.01)
(52) U.S. Cl. ...................................................... 382/154
(58) Field of Classification Search .................. None
 See application file for complete search history.

(56) References Cited

U.S. PATENT DOCUMENTS

| | | | |
|---|---|---|---|
| 8,103,068 B2* | 1/2012 | Zabih et al. ................... 382/128 |
| 2010/0142828 A1* | 6/2010 | Chang et al. .................. 382/209 |
| 2012/0008857 A1* | 1/2012 | Choi .............................. 382/154 |
| 2012/0093408 A1* | 4/2012 | Tang et al. .................... 382/171 |
| 2012/0155747 A1* | 6/2012 | Hwang .......................... 382/154 |
| 2012/0249750 A1* | 10/2012 | Izzat et al. ..................... 348/47 |

* cited by examiner

*Primary Examiner* — Vikkram Bali
(74) *Attorney, Agent, or Firm* — Muncy, Geissler, Olds & Lowe, PLLC (57) ABSTRACT

A stereo matching method based on image intensity quantization is revealed. The method includes several steps. Firstly, provide computer an image pair of an object for image intensity quantization of the image pair to get a quantization result. Then according to the quantization result, a first extracted image pair is generated and used to get a first disparity map. A second extracted image pair is generated similarly to get a second disparity map. Next the two disparity maps are compared with each other to get an image error data. When an error contained in the image error data is smaller than or equal to an error threshold value, the computer outputs the second disparity map. Moreover, accuracy of disparity maps is improved by iteration processing. Therefore, the amount of information for processing is minimized and efficiency of data access/transmission is improved.

8 Claims, 8 Drawing Sheets

STEREO MATCHING METHOD BASED ON IMAGE INTENSITY QUANTIZATION

BACKGROUND OF THE INVENTION

1. Fields of the invention

The present invention relates to an image processing method, especially to a stereo matching method based on image intensity quantization.

2. Descriptions of Related Art

Besides the X axis and the Y axis of general two-dimensional images, visual elements of three-dimensional (3-D) images still includes depth perception, the visual ability to perceive the distance of objects in the images. The depth perception arises from various cues such as binocular disparity. Generally, the brain can detect small differences between the images of an object seen by each eye and combine the offset images to give the perception of 3-D depth.

Stereo matching techniques of nowadays are core techniques of digital photogrammetry and computer vision. Besides conventional way that computes stereo matching over a whole image, a plurality of area-based stereo matching algorithms such as segmentation algorithm, belief propagation, dynamic programming, etc that works on partial images have been developed.

In the segmentation algorithm, an image is segmented according to areas around objects contained in the image. The segmented areas with objects are processed and computed for stereo matching of the objects in some areas so as to create depth of objects in the image. As for the belief propagation, each pixel in the image is represented by a node. By calculating the relation between each node and neighboring nodes, stereo matching is performed on the partial area with object to create depth of objects in the image. The dynamic programming is a kind of recursive processing, repeatedly approaching a certain area of the image to get the optimal solution so as to create depth of objects in the image.

Compared with the conventional stereo matching method over the whole image, the area-based matching method is more accurate. Yet in the area-based matching method, disparity maps are output according to both the area-based matching results together with unmatched regions. Thus not only the computation is increased significantly, the computation time and the amount of processed image data are also increased dramatically. Although the processing accuracy of the stereo matching has been improved by the area-based matching method, a huge amount of information is generated during the stereo matching and computation time is increased.

In order to improve computational efficiency of the above stereo matching methods, several stereo matching techniques with iterative computation have been invented. One among them is through the use of an image pyramid. The image pyramid is a series of images at reduced scales, formed by repeatedly filtering and subsampling the original image in order to generate a sequence of reduced resolution images. Another way is to divide the image into a plurality of segments having foreground and background. Disparity maps between the foreground and background of different areas are obtained and merged so as to get a final result of image processing. Thereby, the computation during stereo matching is improved.

However, no matter the images reduced resolutions or segmented images, the above ways are focused on the image space. Although the computational efficiency is improved, the amount of processed image data during the matching is still quite huge. This has negative effects on data transmission and data access. Thus, for the images processed by conventional stereo matching, the network transmission is not convenient and the data access time is not reduced. For example, digital photogrammetry and computer vision, especially the popular 3-dimensional films (such as IMAX 3D movies), are the most well-known applications of computer vision. Yet the huge amount of data for stereo matching causes inconvenience for users to view 3-dimensional films on the interne or storage media at home.

Thus, there is a need to provide a stereo matching method based on image intensity quantization that provides a variate bit rate image processing for reducing the amount of image data. This helps data transmission as well as computational efficiency and solves the above shortcomings of conventional stereo matching.

SUMMARY OF THE INVENTION

Therefore, it is a primary object of the present invention to provide a stereo matching method based on image intensity quantization by which image pairs are quantized, divided into different layers and compared so as to generate modified images for stereo matching and the amount of image data for the stereo matching process is further reduced.

It is another object of the present invention to provide a stereo matching method based on image intensity quantization that dramatically reduces computation required during the stereo matching process by means of variate bit rate image processing.

In order to achieve the above objects, a stereo matching method based on image intensity quantization according to the present invention includes a plurality of steps. In the beginning, an image pair of an object is provided to a computer. Then, the computer performs quantization of image intensity of the image pair and generates a first extracted image pair according to the quantization result of image intensity of the image pair. Next, a first disparity map is generated according to a first left image and a first right image of the first extracted image pair. Moreover, a second extracted image pair is generated according to the quantization result. Later generate a second disparity map according to a second left image and a second right image of the second extracted image pair. Then, an image error data is obtained by the comparison of the first disparity map with the second disparity map. When an error contained in the image error data is smaller than or equal to an error threshold value, the second disparity map is output. The images for stereo matching are encoded by variate bit rate so that the amount of deta for computation is reduced effectively.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1A:
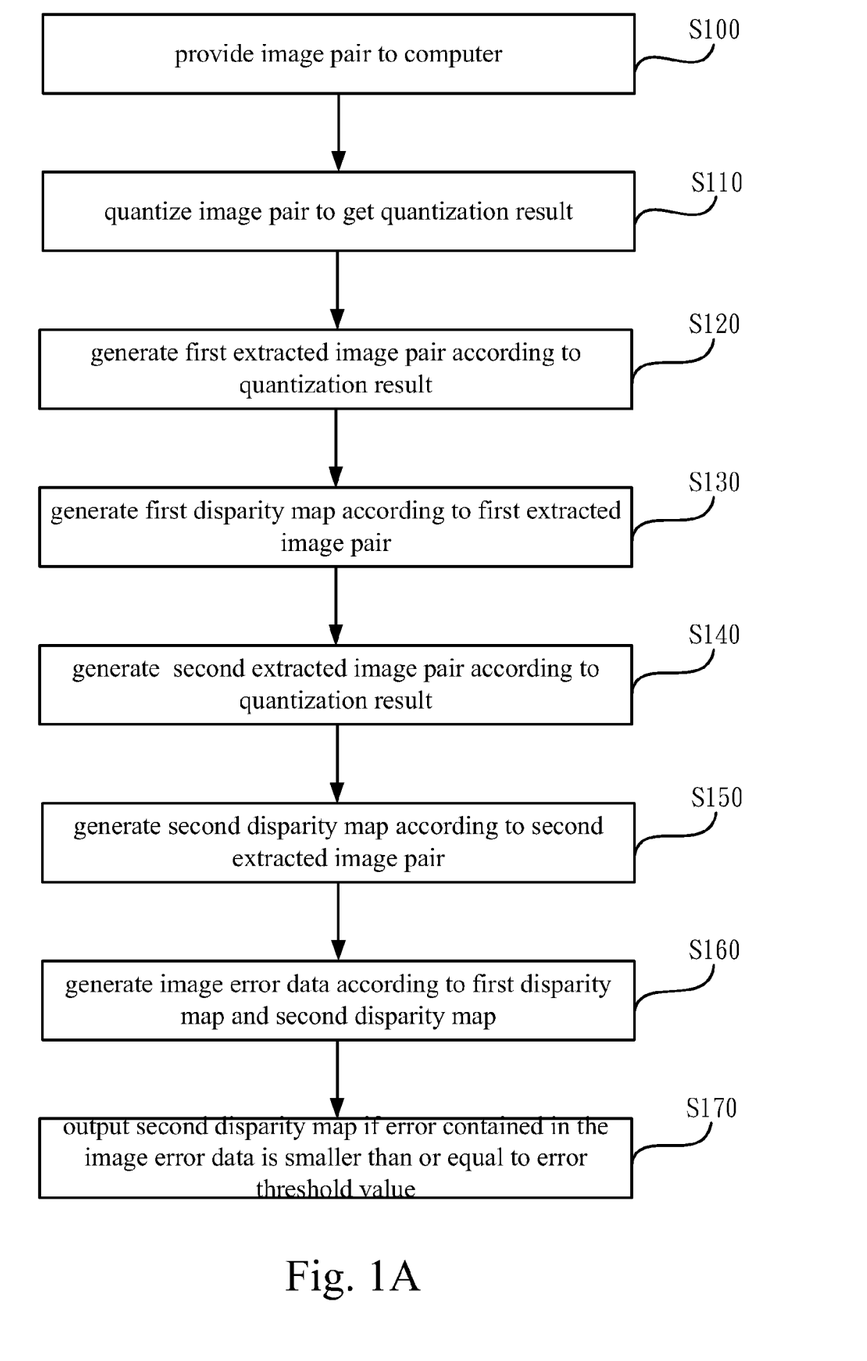
FIG. 1A is a flow chart of an embodiment according to the present invention.

Refer to FIG. 1A, a flow chart of an embodiment according to the present invention is revealed. As shown in the figure, a stereo matching method of the present invention is used to minimize a huge amount of image data for convenience of data storage and transmission. The stereo matching method of the present invention includes following steps:

Step S100: provide an image pair to a computer;

Step S110: quantize the image pair to get a quantization result;

Step S120: generate a first extracted image pair according to the quantization result;

Step S130: generate a first disparity map according to the first extracted image pair;

Step S140: generate a second extracted image pair according to the quantization result;

Step S150: generate a second disparity map according to the second extracted image pair;

Step S160: generate image error data according to the first disparity map and the second disparity map; and Step S170: output the second disparity map if an error contained in the image error data is smaller than or equal to an error threshold value.

Figure 1B:
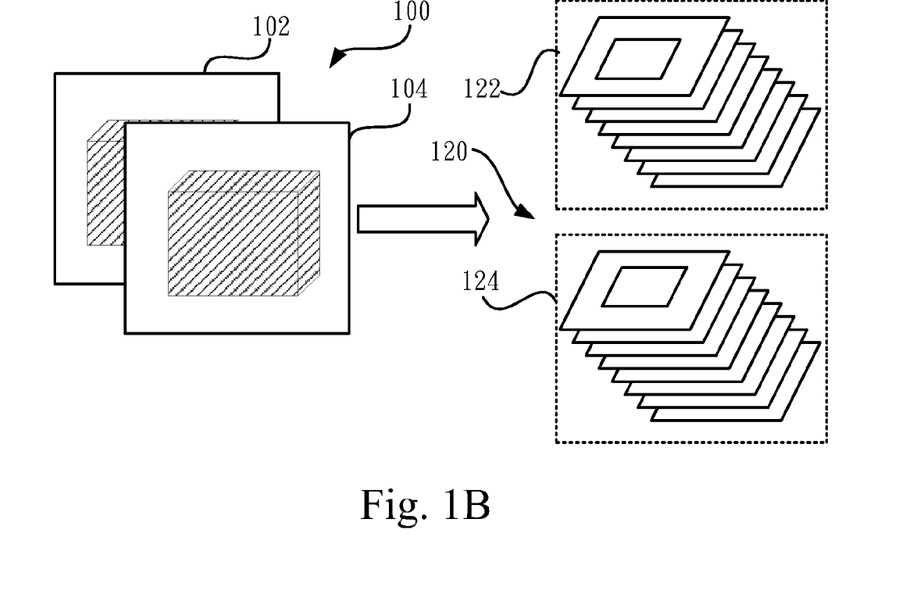
FIG. 1B is a schematic drawing showing a quantization result of an embodiment according to the present invention.
Figure 1C:
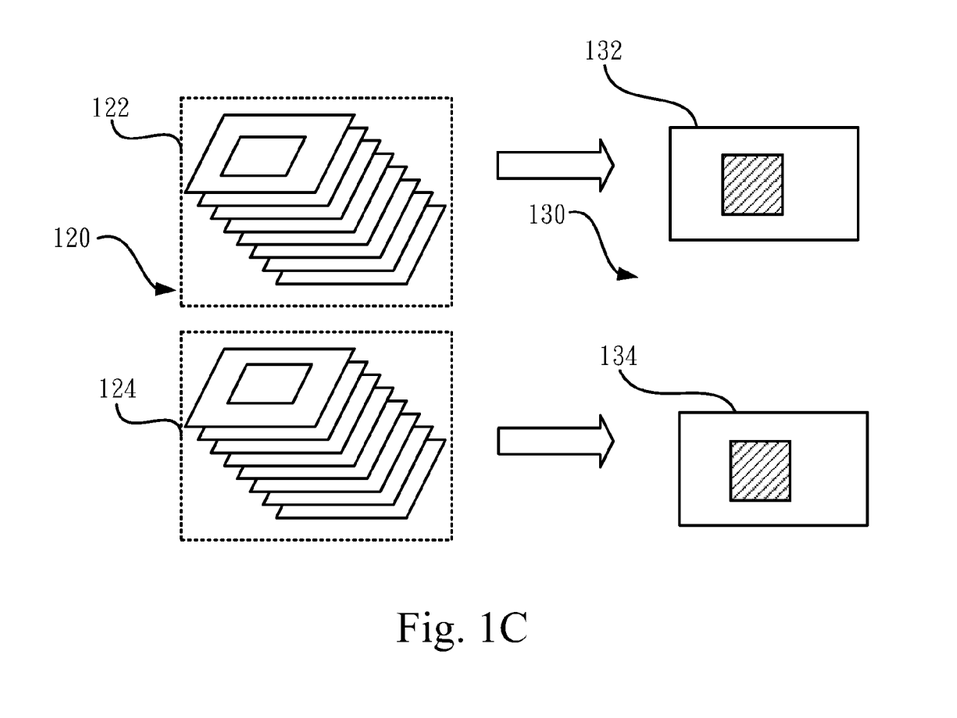
FIG. 1C is a schematic drawing showing image extraction of an embodiment according to the present invention.
Figure 3:
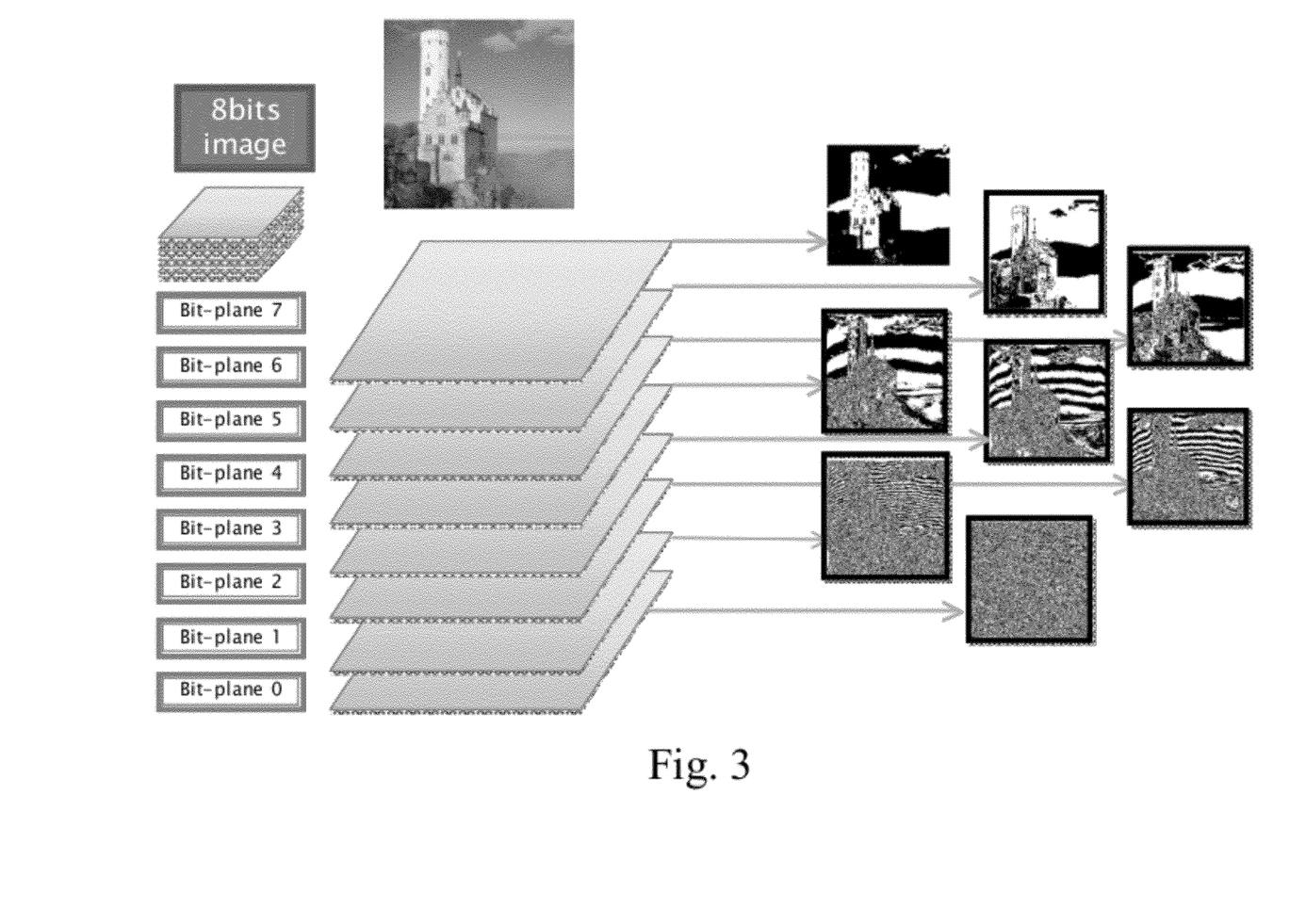
FIG. 3 is a diagram of the quantization result according to the present invention.

Refer to FIG. 1B, in the step S100, one image pair 100 is provided to the computer. The image pair 100 is encoded in 8-bit, including a left image 102 and a right image 104. Refer to the step S110, quantize the image intensity of the image pair 100 to get a quantization result 120. Apply a quantization to the image intensity of the image pair 100 so as to get a plurality of bit planes, each of which is corresponding to each pixel of the image pair 100. In this embodiment, the quantization result 120 is a stack of bit planes. Take an 8-bit grayscale image as an example, the grayscale values of the image pair 100 range from 0 to 255. After the quantization of the image pair 100, the computer gets 8 bit-planes, ranging from bit 0 to bit 7. Each bit-plane is composed of either 0 or 1 and the bit-planes represent the quantization result 120. In this embodiment, the quantization result 120 consists of a first quantization result 122 and a second quantization result 124. The first quantization result 122 is corresponding to the left image 102 while the second quantization result 124 is corresponding to the left image 104. As shown in the FIG. 3, the bit-planes are images with different image intensity. Refer to the step S120, the computer generates a first extracted image pair 130 according to the quantization result 120 mentioned above. As shown in FIG. 1C, the computer generates a first left image 132 according to the first quantization result 122 of the quantization result 120 and also generates a first right image 134 according to the second quantization result 124 of the quantization result 120. The first extracted image pair 130 is formed by the first left image 132 and the first right image 134. For example, in accordance with the quantization result 120, the first extracted image pair 130 is formed by bit-plane extraction that extracts from bit planes 5-7.

Figure 1D:
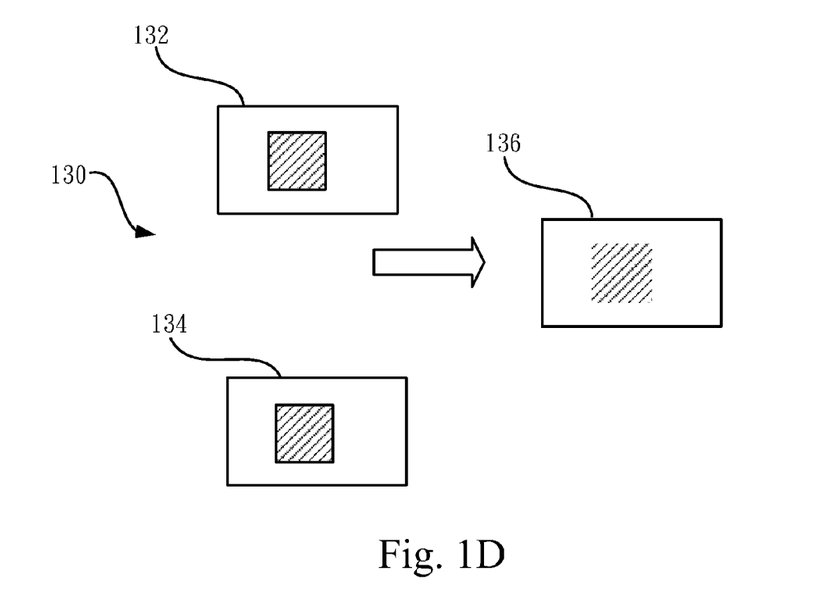
FIG. 1D is a schematic drawing showing a disparity map of an embodiment according to the present invention.
Figure 1E:
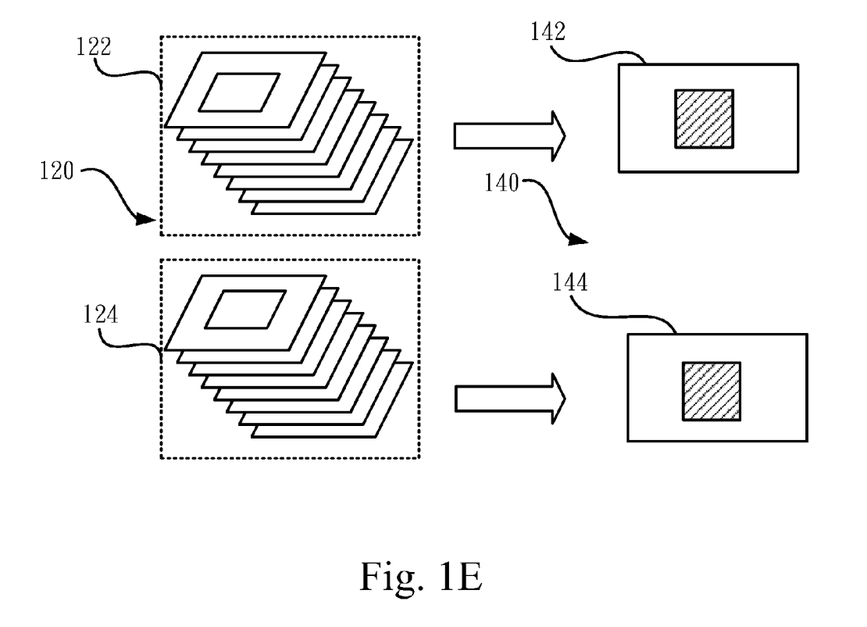
FIG. 1E is a schematic drawing showing another image extraction of an embodiment according to the present invention.
Figure 1F:
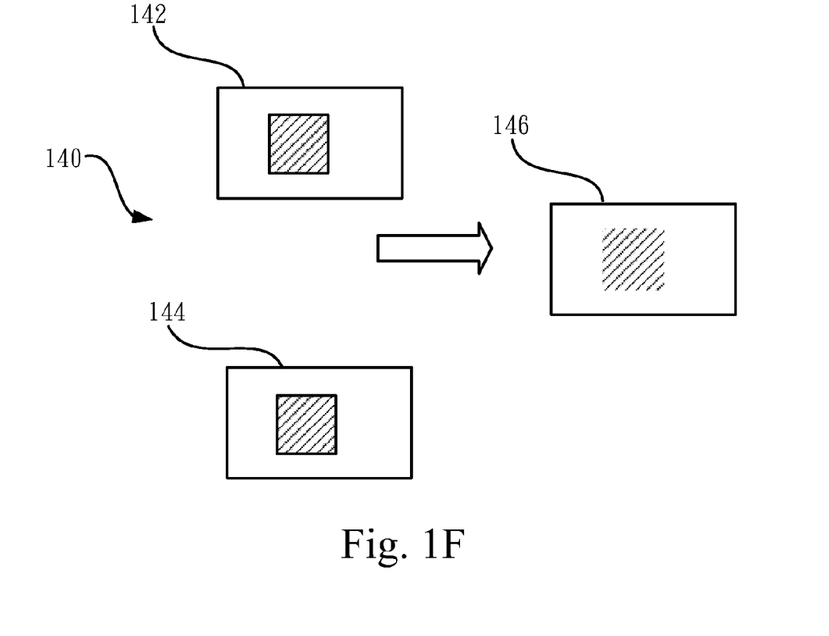
FIG. 1F is a schematic drawing showing another disparity map of an embodiment according to the present invention.
Figure 4:
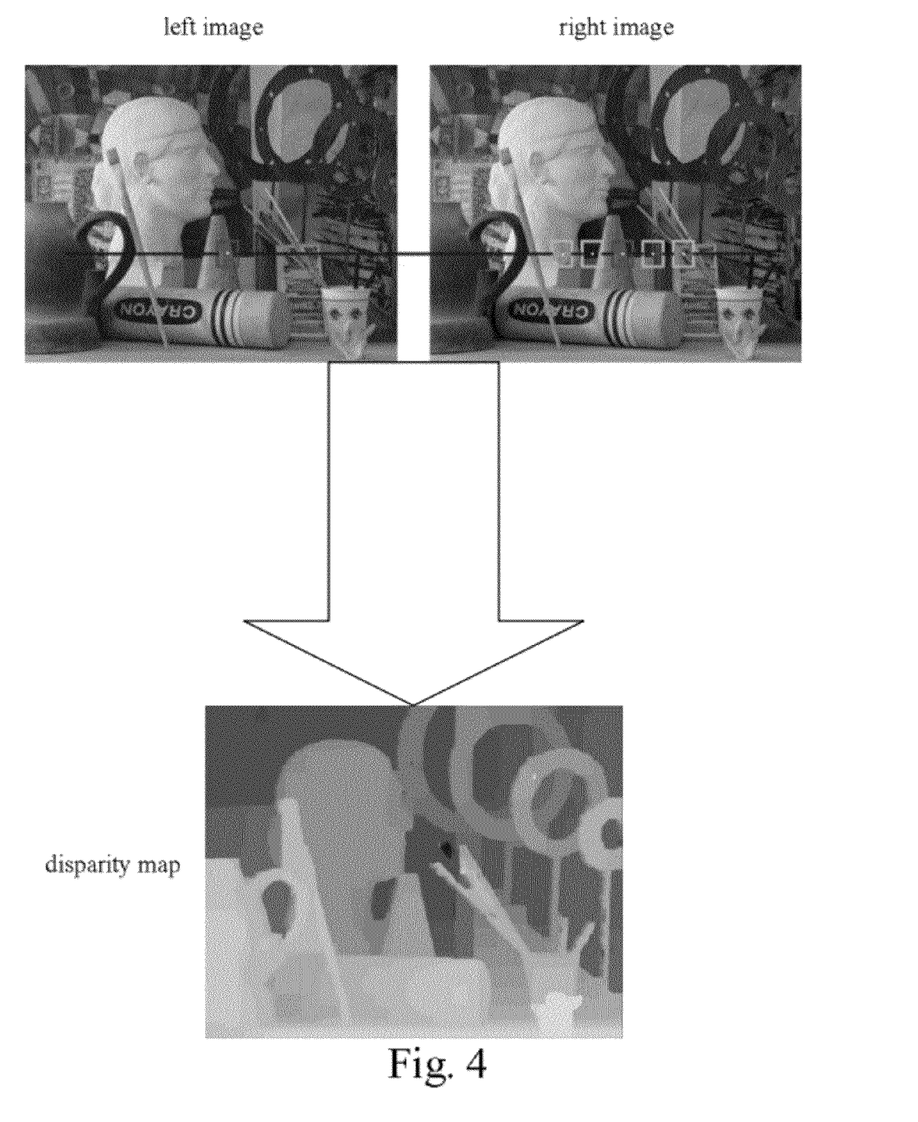
FIG. 4 is a diagram of the disparity map according to the present invention.

Refer to the step S130 and FIG. 1D, the computer generates a first disparity map 136 according to the first extracted image pair 130. Between the first left image 132 and the first right image 134, there is a difference (displacement) in the position of the object viewed. Based on the difference (displacement), the first disparity map 136 is generated, as the figure shown in the FIG. 4. Refer to the step S140, the computer generates a second extracted image pair 140 according to the quantization result 120, as shown in the FIG. 1E. The computer generates a second left image 142 according to the first quantization result 122 of the quantization result 120 and generates a second right image 144 according to the second quantization result 124 of the quantization result 120. The second left image 142 together with the second right image 144 forms the second extracted image 140. The number of bit-planes used in bit-plane extraction of the second extracted image 140 is more than that of the first extracted image 130. For example, the second extracted image pair 140 is generated by bit-plane extraction that extracts from bit planes 4-7 of the quantization result 120. Then refer to the step S150 and FIG. 1F, the computer generates a second disparity map 146 that records the difference between the second left image 142 and the second right image 144 according to the second extracted image pair 140.

Figure 1G:
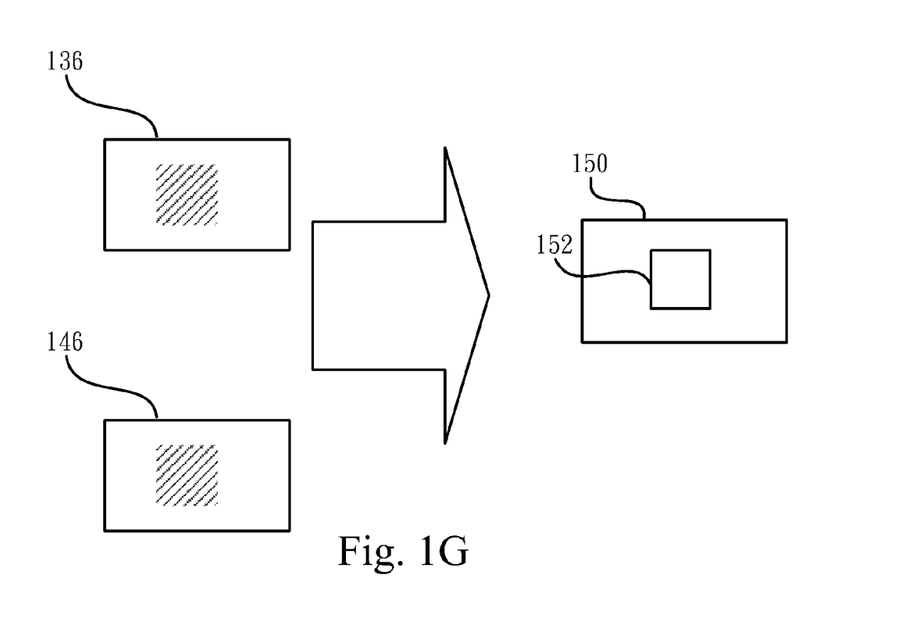
FIG. 1G is a schematic drawing showing an image error data of an embodiment according to the present invention.

Next, refer to the step S160 and FIG. 1G, the computer generates image error data 150 according to the first disparity map 136 and the second disparity map 146. In this embodiment, the image error data 150 is represented by a figure of an image comparison area. That's comparison area 152. The computer makes comparison of the second disparity map 146 with the first disparity map 136 so as to get the image error data 150 representing the difference (error) between the disparity maps and the difference is corresponding to the comparison image 152. The image error data 150 includes at least one comparison area 152 so as to add bit rate to the modified image. In the present invention, there is no need to increase the bit rate over the whole image. Then, as shown in the step S170, compare the image error data 150 with an error threshold value. In this embodiment, the error threshold value is 10% of the image width. The computer outputs the second disparity map 146 if the error contained in the image error data 150 is smaller than or equal to the error threshold value. The optimal error threshold value set by the computer is one hundredth of the width of the.

It is learned that the present invention uses comparison between the left and the right images with different bit rate to generate the disparity error data. Moreover, the modified disparity map is generated by adding bit rate to the comparison area. If the comparison result of the disparity maps is smaller than or equal to the error threshold value, the disparity map corresponding to the modified extracted image is output so as to achieve better stereo matching. The present invention extracts images from the quantization results for stereo matching so as to reduce computation during the stereo matching process. Therefore, the method of the present invention meets the requirements of stereo matching and reduces the amount of information so that transmission efficiency is improved. For example, while the computer generating the first extracted image pair, the grayscale values of the first extracted image pair extracted in 3-bit unit can be something like, 0, 32, 64, 96, 128, 160, 192, 224. When the computer extracts the second extracted image pair, 4-bit is used and the grayscale values of the second extracted image pair are something like 0, 16, 32, 48, 64, 80, 96, 112, 128, 144, 160, 176, 192, 208, 224, 240. The result of comparison between the second disparity map and the first disparity map is an image error data. The error contained in the image error data, the difference between the first disparity map and the second disparity map, is 0. Thus, the computer outputs the second disparity map. Therefore, full images for stereo matching are not necessary to be received by the computer during the stereo matching of images and efficiency of the stereo matching processing is increased.

The followings are examples showing iterations and convergence of the disparity maps in the present invention.

Figure 2A:
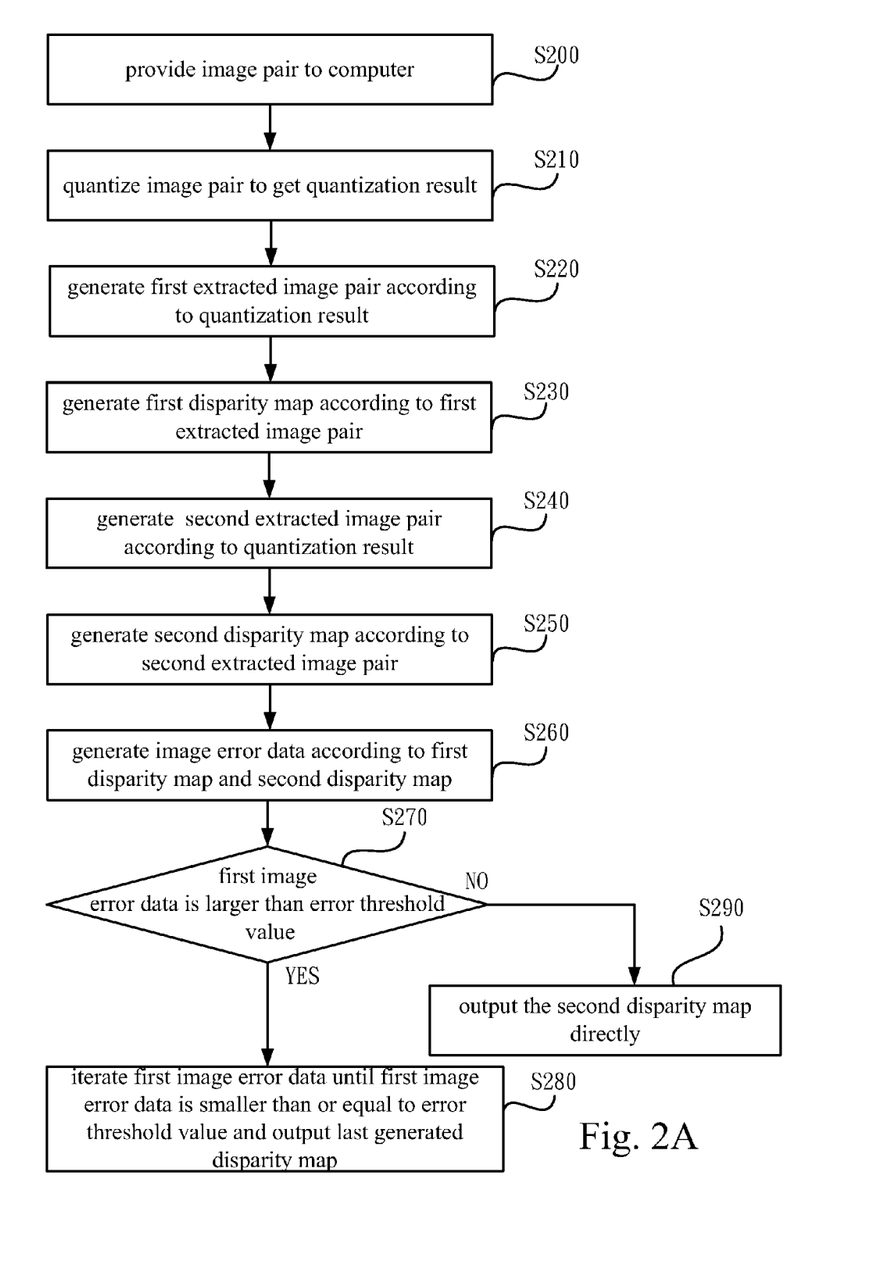
FIG. 2A is a flow chart of another embodiment according to the present invention.

Refer to FIG. 2A, a flow chart of another embodiment of the present invention is revealed. The difference between this embodiment and the one in FIG. 1A is in that this embodiment further includes a step of iterations and convergence of the image error data. As shown in the figure, a stereo matching method of the present invention achieves error convergence by iterations of the image error data. A stereo matching method of the present invention includes the following steps:

step S200: provide an image pair to a computer;

step S210: quantize the image pair to get a quantization result;

step S220: generate a first extracted image pair according to the quantization result;

step S230: generate a first disparity map according to the first extracted image pair;

step S240: generate a second extracted image pair according to the quantization result;

step S250: generate a second disparity map according to the second extracted image pair;

step S260: generate a first image error data according to the first disparity map and the second disparity map;

step S270: check whether the first image error data is larger than an error threshold value;

step S280: iterate the first image error data until the first image error data is smaller than or equal to the error threshold value and output the last generated disparity map;

step S290: output the second disparity map directly.

In the step S200, the image pair of an object is provided to the computer, and the image pair consists of a left image and a right image. Refer to the step S210, the computer performs quantization processing on image intensity of the image pair so as get the quantization result of the image pair. The quantization result includes a quantization result of the left image and a quantization result of the right image. As shown in the step S220, the computer generates a first left image and a first right image of a first extracted image pair respectively according to the quantization result of the left image and the quantization result of the right image. Then refer to the step S230, the computer generates a first disparity map according to the first extracted image pair. Compare the first left image with the first right image so as to generate the first disparity map. Next refer to the step S240, the computer generates a second left image and a second right image of a second extracted image pair according to the quantization result of the left and right images of the image pair respectively. As shown in the step S250, the computer generates a second disparity map according to the second extracted image pair. That means to compare the second left image with the second right image for generation of the second disparity map.

Later as shown in the step S260, the computer generates a first image error data according to the first disparity map and the second disparity map. Refer to the step S270, check if the first image error data generated in the step S260 is larger than an error threshold value. The computer compares the image error data with the error threshold value. When the first image error data is larger than the error threshold value, the step S280 is run by the computer. If the first image error data is not larger than (smaller than or equal to) the error threshold value, the computer takes the step S290. The first image error data is used to record a comparison area of the disparity map.

In the step S280, the computer iterates the image error data generated in the step S260 for convergence until the image error data is not larger than the error threshold value and then the disparity map generated last is output. For example, the image error data is iterated until an error contained in the image error data is smaller than or equal to an error threshold value that is one percent of the image width. As shown in the step S290, the second disparity map generated last is output by the computer.

Figure 2B:
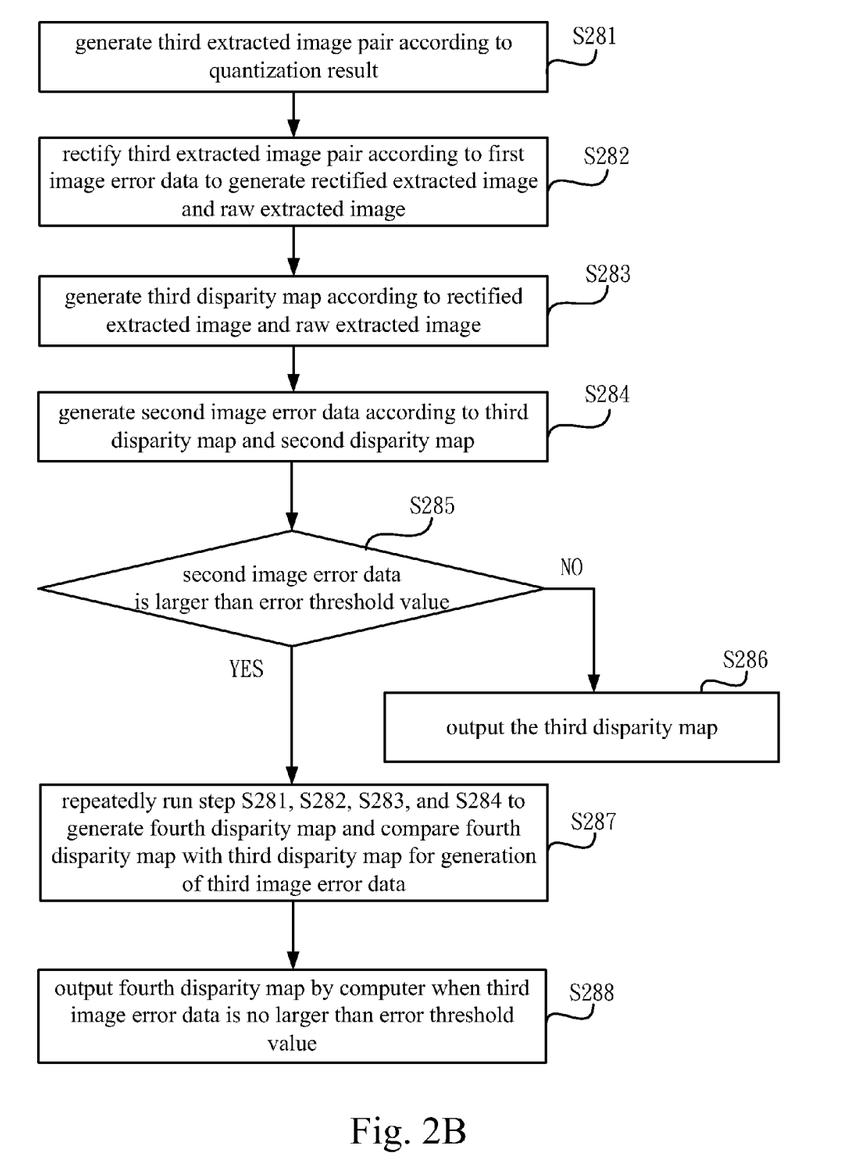
FIG. 2B is a flow chart of a further embodiment according to the present invention.

Refer to the FIG. 2B, the step S280 includes the following steps:

step S281: generate a third extracted image pair according to the quantization result;

step S282: modify the third extracted image pair according to the first image error data to generate a modified extracted image and a raw extracted image;

step S283: generate a third disparity map according to the modified extracted image and the raw extracted image;

step S284: generate a second image error data according to the third disparity map and the second disparity map;

step S285: check whether the second image error data is larger than the error threshold value;

step S286: output the third disparity map;

step S287: repeatedly run the step S281, S282, S283, and S284 to generate a fourth disparity map and compare the fourth disparity map with the third disparity map for generation of a third image error data; and step S288: output the fourth disparity map by the computer when the third image error data is no larger than the error threshold value.

As shown in the step S281, the computer generates the more significant third extracted image pair (with more bits) according to the quantization result of the image pair. Then in the step S282, the computer modified one of the third extracted image pair so as to generate the modified extracted image and the raw extracted image. In this embodiment, the left image is used as the reference image. Thus a third left image of the third extracted image pair is modified. The modified extracted image is the modified third left image while the raw extracted image is a third right image. Yet the present invention is not limited to this embodiment. If the reference image is the right image, the computer modified the third right image of the third extracted image pair according to the first image error data. Next refer to the step S283, the computer generates the third disparity map according to the modified extracted image and the raw extracted image. In this embodiment, the third disparity map is generated by the computer according to the modified image of the third left image and the third right image. The third disparity map represents difference between the modified image of the third left image and the third right image.

Refer to the step S284, the computer generates a second image error data according to the comparison between the third disparity map and the second disparity map. Then take the step S285, the computer checks whether the second image error data is larger than the error threshold value. When the second image error data is smaller than or equal to the error threshold value, run the step S286, the computer outputs the third disparity map. When the second image error data is larger than the error threshold value, take the step S287, the computer executes the step S281, the step S282, the step S283 and the step S284 again to generate the fourth disparity map, compare the fourth disparity map with the third disparity map and then further generate a third image error data. That means the computer generates a fourth extracted image pair according to the quantization result and modified the fourth extracted image pair by the second image error data so as to generate the fourth disparity map. Then the fourth disparity map is compared with the third disparity map to generate the third image error data. As shown in the step S288, the computer outputs the fourth disparity map when the third image error data is smaller than or equal to the error threshold value. In this embodiment, the method ends at the step S288 due to the third image error data that is smaller than or equal to the error threshold value. Once the computer checks that the third image error data is larger than the error threshold value, it continues to generate the next extracted image pair and modified the next extracted image pair according to the previous image error data so as to generate the next disparity map. Then the next disparity map is compared with the present disparity map to generate the next image error data. And whether the next image error data is larger than the error threshold value is checked to determine whether the iteration continues or not. Therefore, the accuracy of the output disparity map can be adjusted by setting the error threshold value.

From the above embodiments, it is learned that the present invention generates image error data by comparison between disparity maps generated from extracted image pairs having different bit rate. Then partial of the extracted image pair with higher bit rate is modified by the image error data and is used for stereo matching. Moreover, image comparison area of the image error data is reduced gradually by iterations for convergence to reduce computation during the stereo matching process. Thus the computation during the processing processes is minimized by comparison, modification and iterations for convergence of the disparity maps. Therefore, the present invention meets the requirements of the stereo matching, reduces the amount of information, increases transmission efficiency, and improves data access efficiency.

By the low amount of data for processing, the stereo matching of the present invention can be applied to hot shooting techniques with plenty of image processing and related equipments. Moreover, high dynamic range images, images with a high bit rate, provided by the present invention are a trend of image processing in the future.

In summary, a stereo matching method based on image intensity quantization of the present invention mainly sets up image error data by disparity maps and the image error data is used to modify bit rate of partial images. Moreover, by iterations for convergence, the size and bit rate of the comparison area are gradually increased. Thereby the present invention has following advantages:

1. The bit rate of partial image is modified by binary maps and used for stereo matching so as to reduce the computation during the modification process dramatically.

2. The modification is sequentially improved by iterations for convergence so that the total amount of information is significantly decreased.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A stereo matching method based on image intensity quantization comprising the steps of:
   providing an image pair of an object to a computer
   performing an image intensity quantization of the image pair by the computer to get a quantization result of the image pair;
   generating a first extracted image pair by the computer according to the quantization result and the first extracted image pair having a first left image and a first right image;
   generating a first disparity map by the computer according to the first left image and the first right image;
   generating a second extracted image pair by the computer according to the quantization result and the second extracted image pair having a second left image and a second right image;
   generating a second disparity map by the computer according to the second left image and the second right image; and
   generating a first image error data by the computer according to comparison of the first disparity map with the second disparity map; when an error contained in the first image error data is smaller than or equal to an error threshold value, the second disparity map is output by the computer.

2. The method as claimed in claim 1, wherein in the step of performing an image intensity quantization of the image pair by the computer to get a quantization result of the image pair, the quantization is toward intensity level distribution of the image pair so as to generate the quantization result having a first quantization result and a second quantization result; the first quantization result is corresponding to a left image of the image pair while the second quantization result is corresponding to a right image of the image pair.

3. The method as claimed in claim 2, wherein the first quantization result is a plurality of bit planes and the second quantization result is a plurality of bit planes.

4. The method as claimed in claim 1, wherein after the step of generating a first image error data by the computer according to comparison of the first disparity map with the second disparity map, the method further comprising a step of:
   comparing the image error data with the error threshold value.

5. The method as claimed in claim 1, wherein in the step of generating a first image error data by the computer according to comparison of the first disparity map with the second disparity map, the second disparity map is compared with the first disparity map so as to get a disparity difference between the first disparity map and the second disparity map and further generate the image error data according to the disparity difference between the first disparity map and the second disparity map.

6. The method as claimed in claim 1, wherein when the error contained in the first image error data is larger than the error threshold value, the method further comprising the steps of:
   generating a third extracted image pair by the computer according to the quantization result;
   modifying the third extracted image pair by the computer according to the first image error data to generate a modified extracted image and a raw extracted image;
   generating a third disparity map by the computer according to the rectified extracted image and the raw extracted image; and generating a second image error data by the computer according to the third disparity map and the second disparity map;

wherein when an error contained in the second image error data is larger than the error threshold value, the computer repeatedly runs the above steps to generate a fourth extracted image pair and a corresponding fourth disparity map and then compare the fourth disparity map with the third disparity map for generation of a third image error data and the fourth disparity map is output when an error contained in the third image error data is smaller than or equal to the error threshold value; if the error contained in the second image error data is smaller than or equal to the error threshold value, the third disparity map is output by the computer.

7. The method as claimed in claim 1, wherein the error threshold value is one hundredth of image width of the image pair.

8. The method as claimed in claim 1, wherein the first extracted image pair and the second extracted image have different extracted bit rate.

* * * * *